US011294878B2

(12) United States Patent
Louvau et al.

(10) Patent No.: US 11,294,878 B2
(45) Date of Patent: Apr. 5, 2022

(54) USING BORDER DATA STRUCTURE WITH INDEX

(71) Applicant: Microsoft Technology Licensing, LLC, Redmond, WA (US)

(72) Inventors: Scott M. Louvau, Redmond, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 16/868,206

(22) Filed: May 6, 2020

(65) Prior Publication Data

US 2021/0349873 A1 Nov. 11, 2021

(51) Int. Cl.
*G06F 16/00* (2019.01)
*G06F 16/22* (2019.01)

(52) U.S. Cl.
CPC ...... *G06F 16/2272* (2019.01); *G06F 16/2291* (2019.01)

(58) Field of Classification Search
CPC .......... G06F 16/2272; G06F 16/2291
See application file for complete search history.

(56) References Cited

U.S. PATENT DOCUMENTS

| 5,454,098 | A | * | 9/1995 | Pisello | G06F 12/0866 |
| | | | | | 703/24 |
| 8,055,645 | B1 | * | 11/2011 | Sinha | G06F 16/13 |
| | | | | | 707/711 |
| 2003/0070056 | A1 | * | 4/2003 | Greco | G11B 27/329 |
| | | | | | 711/202 |
| 2005/0027788 | A1 | * | 2/2005 | Koopmans | H04L 67/32 |
| | | | | | 709/200 |
| 2018/0046555 | A1 | * | 2/2018 | Kedem | G06F 11/1451 |
| 2018/0107419 | A1 | * | 4/2018 | Sachdev | G06F 3/065 |
| 2019/0286369 | A1 | * | 9/2019 | Liu | G06F 12/0868 |

OTHER PUBLICATIONS

"Using an illegal UTF-8 octet as a delimiter in a std::string", Retrieved from: https://stackoverflow.com/questions/56382054/using-an-illegal-utf-8-octet-as-a-delimiter-in-a-stdstring, May 30, 2019, 2 Pages.
Lynn, Shane, "The Pandas DataFrame—loading, editing, and viewing data in Python", Retrieved from: https://web.archive.org/web/20180220203640/https://www.shanelynn.ie/using-pandas-dataframe-creating-editing-viewing-data-in-python/, Feb. 20, 2018, 18 Pages.
"International Search Report and Written Opinion Issued in PCT Application No. PCT/US21/025699", dated May 31, 2021, 12 Pages.

* cited by examiner

*Primary Examiner* — Shew Fen Lin
(74) *Attorney, Agent, or Firm* — Workman Nydegger (57) ABSTRACT

A data structure that includes border data structures that appear at the respective interfaces between each of at least some of the segments in the data structure. The border does not conform to a data format for any of the elemental data types of the elemental data items represented within the data structure, and does not represent a size of any of the neighboring segments. Second, the data structure also includes an index. When writing the data structure, the writer tracks the position of each of the regions. When all segments and regions have been written, the writer can then write an index that represents the position of each region. The reader can then use that index to quickly read from only those regions of interest, and quickly skip over regions not of interest.

18 Claims, 6 Drawing Sheets

USING BORDER DATA STRUCTURE WITH INDEX

BACKGROUND

In the information age, data is essential. Computing systems organize data in accordance with particular formats called "data structures". A data structure is a collection of data values and defined relationships amongst those values. Data structures may also potentially include functions or operations that can be applied to the data values.

To allow the semantics of a data structure to be usable across different systems, the semantics are often written into a data exchange format file that is recognized by a wide variety of different systems. A commonly-used conventional data exchange format is JavaScript Object Notation (JSON). JSON supports plain text representation of various JavaScript data types including strings, numbers, objects, arrays, Booleans, and nulls. The data exchange format file may then be serialized for communication over the physical network.

Various systems write data structures in the form of a data exchange format file, so that the semantics of the data structures can be shared cross-platform. The various systems can also read the data exchange format file to formulate a data structure appropriate for the platform run by the system. Thus, each system can access the same data exchange format file to create a respective data structure that is specific to each platform, but still represents the same semantics. Thus, each system can access the same semantics albeit using a potentially different data structure in memory. Any type of data structure can be represented in data exchange format files. Thus, small data structures can be represented, and large data structures can be represented. Thus, data exchange format files may likewise be small or large, depending on the volume of semantics it represents.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein permit data structures to be written to and read from quickly, even if those data structures are very large. To set context, the data structure includes multiple elemental data items of different elemental data types. For instance, the data structure could include characters (for strings), numbers, and potentially other elemental data types as well. The elemental data items are combined with neighboring data items to form segments within the data structure. For instance, a segment could include an array, an object, a string, a property-value pair, or any other data item composed of multiple elemental data types. An example of such a data structure is a binary data exchange format file, which could represent data items of a variety of data types that conform to a programming language.

In accordance with the principles described herein, the data structure further includes two unique structures. First, there are predetermined border data structures that appear at the respective interfaces between each of at least some of the segments in the data structure. The predetermined border data structure does not conform to a data format for any of the elemental data types of the elemental data items represented within the data structure. Furthermore, the predetermined border data structure does not represent a size of any of the neighboring segments. Thus, the border data structure can be used as a marker to mark the beginning or end of a segment without knowing what the size of that segment is. A reader that is reading through the data structure can still use the border data structure to identify the beginning and end of each segment. The data structure also includes an index that represents a position of regions within the data structure, each region including one or more segments.

When writing the data structure, the writer does not need to know how big a segment is prior to writing the segment. Instead, the writer just continues writing in a single pass, without ever needing to return and update with a pre-indication of size. Instead, the reader will use the border markers to identify the beginning and/or end of at least some of the segments. In cases where the writer does happen to know the size of a segment before writing that segment, the writer can of course include a pre-indication of the size to help the reader, but the principles described herein avoid the need for a pre-indication of size of the segment.

Second, the data structure also includes an index. When writing the data structure, the writer tracks the position of each of the regions. When all segments and regions have been written, the writer can then write an index that represents the position of each region (e.g., at the end of the data structure). Alternatively, if the index is to be kept as a separate data structure, the index can be written for each region as the writer writes each region. Optionally, that separate index can then be written at the end of the segments and regions. In any case, the reader can then use that index to quickly read from only those regions of interest, and quickly skip over regions not of interest, so as to allow for rapid reading of the data structure and selecting data items from the data structure, without requiring the entirety of the data structure be loaded into an object model in memory. Thus, writing of large data structures may be done quickly in a single pass, and reading of and selecting from the data structures may likewise be done quickly.

As an added benefit, since border marking is done by using illegal formats in any other elemental data types, the use of escaping is no longer required since there is no chance that the border data structure is instead an actual elemental data item of any of the elemental data types. For instance, quotation marks may be included within a string, without escaping the quotation marks. This obviates the need for more complicated logic used to disambiguate a border of a segment with a legal elemental data item within that segment.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein permit data structures to be written to and read from quickly, even if those data structures are very large. To set context, the data structure includes multiple elemental data items of different elemental data types. For instance, the data structure could include characters (for strings), numbers, and potentially other elemental data types as well. The elemental data items are combined with neighboring data items to form segments within the data structure. For instance, a segment could include an array, an object, a string, a property-value pair, or any other data item composed of multiple elemental data types. An example of such a data structure is a binary data exchange format file, which could represent data items of a variety of data types that conform to a programming language.

In accordance with the principles described herein, the data structure further includes two unique structures. First, there are predetermined border data structures that appear at the respective interfaces between each of at least some of the segments in the data structure. The predetermined border data structure does not conform to a data format for any of the elemental data types of the elemental data items represented within the data structure. Furthermore, the predetermined border data structure does not represent a size of any of the neighboring segments. Thus, the border data structure can be used as a marker to mark the beginning or end of a segment without knowing what the size of that segment is. A reader that is reading through the data structure can still use the border data structure to identify the beginning and end of each segment. The data structure also includes an index that represents a position of regions within the data structure, each region including one or more segments.

When writing the data structure, the writer does not need to know how big a segment is prior to writing the segment. Instead, the writer just continues writing in a single pass, without ever needing to return and update with a pre-indication of size. Instead, the reader will use the border markers to identify the beginning and/or end of at least some of the segments. In cases where the writer does happen to know the size of a segment before writing that segment, the writer can of course include a pre-indication of the size to help the reader, but the principles described herein avoid the need for a pre-indication of size of the segment.

Second, the data structure also includes an index. When writing the data structure, the writer tracks the position of each of the regions. When all segments and regions have been written, the writer can then write an index that represents the position of each region (e.g., at the end of the data structure). Alternatively, if the index is to be kept as a separate data structure, the index can be written for each region as the writer writes each region. Optionally, that separate index can then be written at the end of the segments and regions. In any case, the reader can then use that index to quickly read from only those regions of interest, and quickly skip over regions not of interest, so as to allow for rapid reading of the data structure and selecting data items from the data structure, without requiring the entirety of the data structure be loaded into an object model in memory. Thus, writing of large data structures may be done quickly in a single pass, and reading of and selecting from the data structures may likewise be done quickly.

As an added benefit, since border marking is done by using illegal formats in any other elemental data types, the use of escaping is no longer required since there is no chance that the border data structure is instead an actual elemental data item of any of the elemental data types. For instance, quotation marks may be included within a string, without escaping the quotation marks. This obviates the need for more complicated logic used to disambiguate a border of a segment with a legal elemental data item within that segment.

Because the principles described herein are performed in the context of a computing system, some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
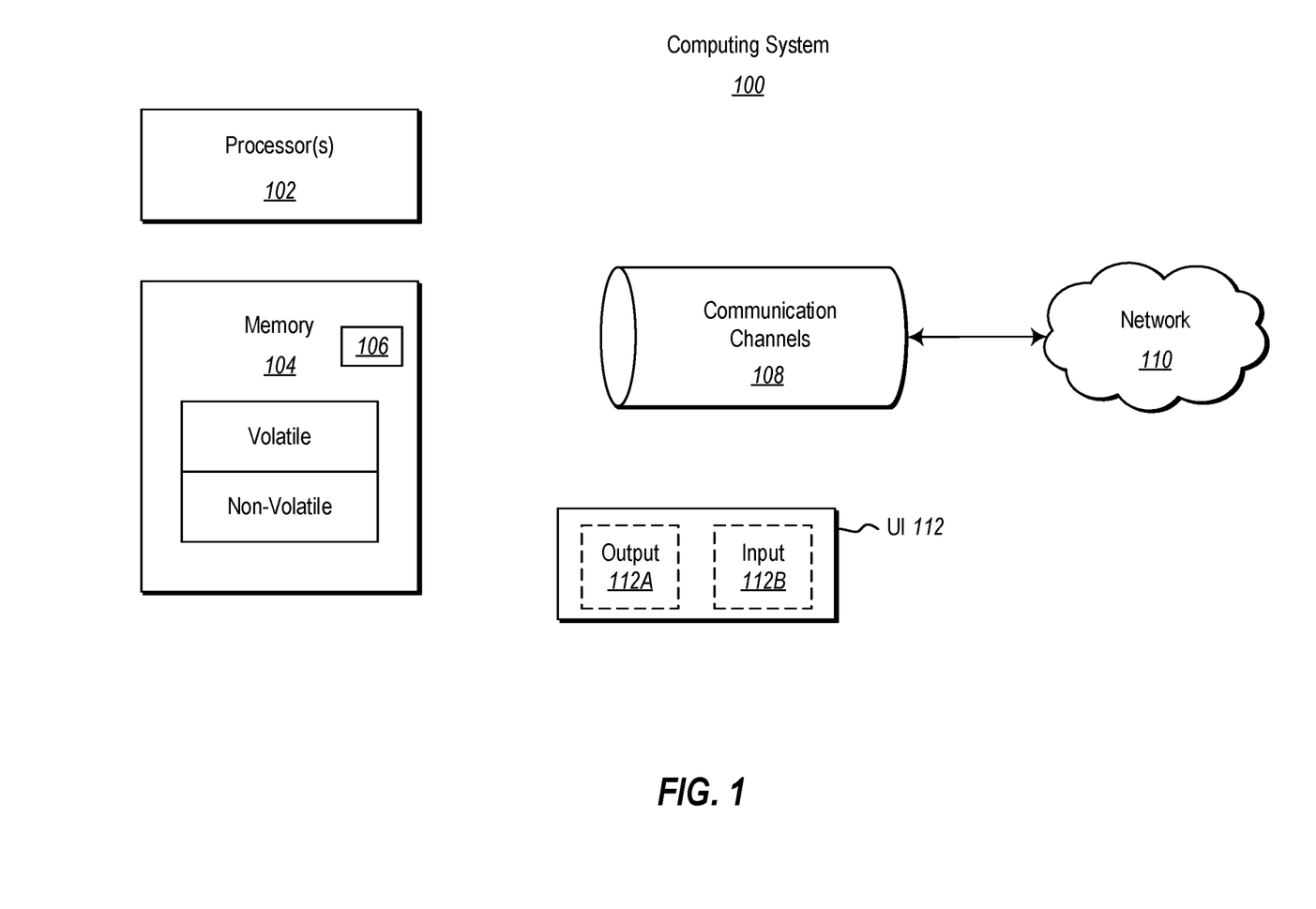
FIG. 1 illustrates an example computing system in which the principles described herein may be employed.

As illustrated in FIG. 1, in its most basic configuration, a computing system 100 includes at least one hardware processing unit 102 and memory 104. The processing unit 102 includes a general-purpose processor. Although not required, the processing unit 102 may also include a field programmable gate array (FPGA), an application specific integrated circuit (ASIC), or any other specialized circuit. In one embodiment, the memory 104 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

Figure 2:
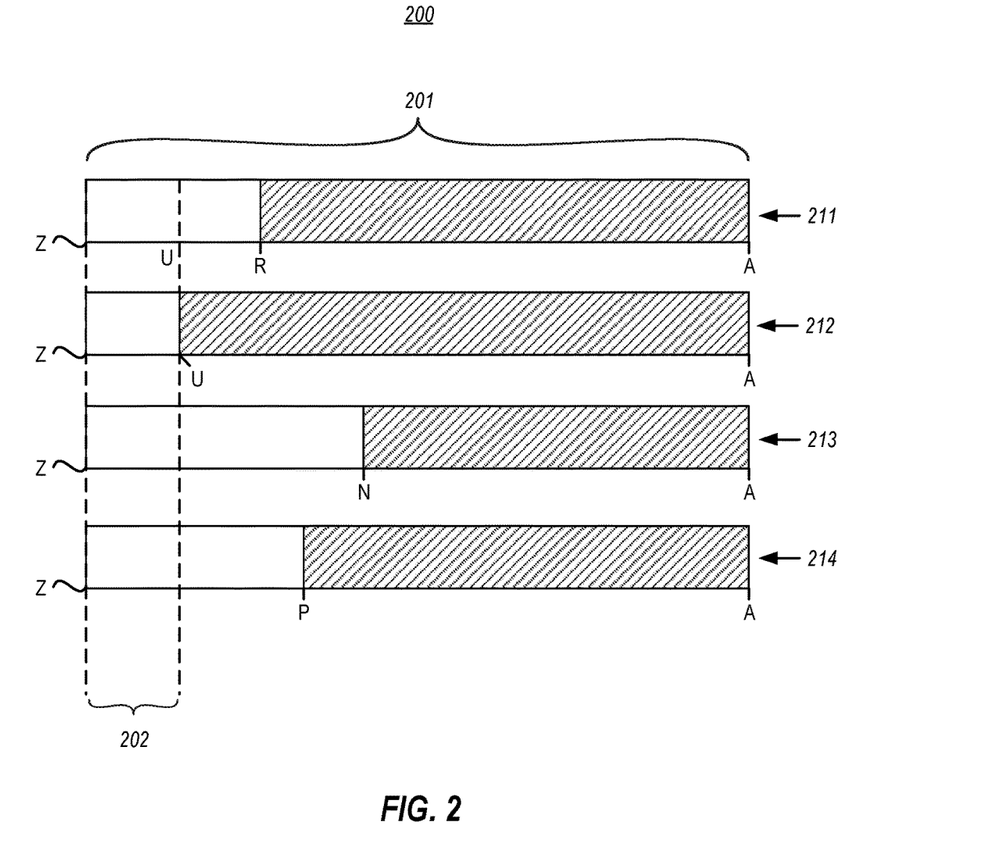
FIG. 2 illustrates an example of a byte-extent of several elemental data types that represents elemental data types of a data structure.

FIG. 2 illustrates an example 200 of a byte-extent of several elemental data types 211 through 214 that represents elemental data types of a data structure, such as the data structure described below with respect to FIG. 3. An "elemental data type" is a data type that does not have constituent elements and thus cannot sensibly be subdivided further on a computing system. Examples of elemental data types include numbers, characters, null values, and Boolean values. An example of a data type that is not an elemental data type is an object, a property-value pair, arrays or strings, because each of these have constituent elements that are also represented in a computing system. For instance, objects include constituent functions, properties, and values. Furthermore, property-value pairs include constituent properties and values, arrays include constituent elements, and strings include constituent characters. A data item that is of an elemental data type is called herein an "elemental data item".

Referring again to FIG. 2, each byte extent for each elemental data type of a data structure includes a same absolute extent 201 of possible values. An 8-bit byte can of course have a total of 2^8 or 256 possible values. This extent is symbolically represented in FIG. 2 by each elemental data type 211 ranging from A to Z. However, not all byte values within the absolute byte extent 201 will be usable. Which byte value are usable and which byte values are unusable will depend on the elemental data type.

For instance, in FIG. 2, valid value ranges are represented symbolically by rightward cross-hatching, and so the elemental data type 211 has valid value range A to R, elemental data type 212 has valid value range A to U, elemental data type 213 has valid value range A to N, and elemental data type 214 has valid value ranges A to P. Note that there is a certain range 202 that include values that, while within the absolute extent 201, are not usable or valid for any of the elemental data types 202. In accordance with the principles described herein, these invalid values are used to represent a border data structure within the data structure (e.g., border data structures 331, 332, 334, 335, 336, 338 and 339 of the data structure 300) within the data structure. Thus, the border data structure is a selected from within region 202 of FIG. 2—being a value that is not a valid value for any of the elemental data types of any of the elemental data items of the data structure.

As a more concrete example, suppose that the elemental data types include characters and numbers. Now suppose characters are defined by the UTF-8 format. Any byte value that is greater than 0xF5 (hexadecimal) is not valid under UTF-8 representations of characters. Furthermore, suppose that numbers are represented in little-endian representations of numbers, albeit with an adjustment to make sure the most significant bit is always a binary zero. In this case, since all bytes of any of these elemental data types will never include values above 0xF5 hexadecimal, then a subset of the invalid values (e.g., 0xFC hexadecimal and above (or in other words, any byte having six leading binary ones) can be used as border markers. Likewise, Booleans and null values can also be represented without using six leading binary ones in the byte value. Accordingly, in one embodiment, the border data structures is a byte having the six most significant bits being a binary 1. Since such byte values are not legal values for representing numbers or characters of any other elemental data type for that data structure, they can validly represent a border data structure with no risk of ambiguously also representing a valid elemental data item. That said, the principles described herein more generally use any illegal format (e.g., byte value) of any elemental data type as being a border data structure.

Figure 3:
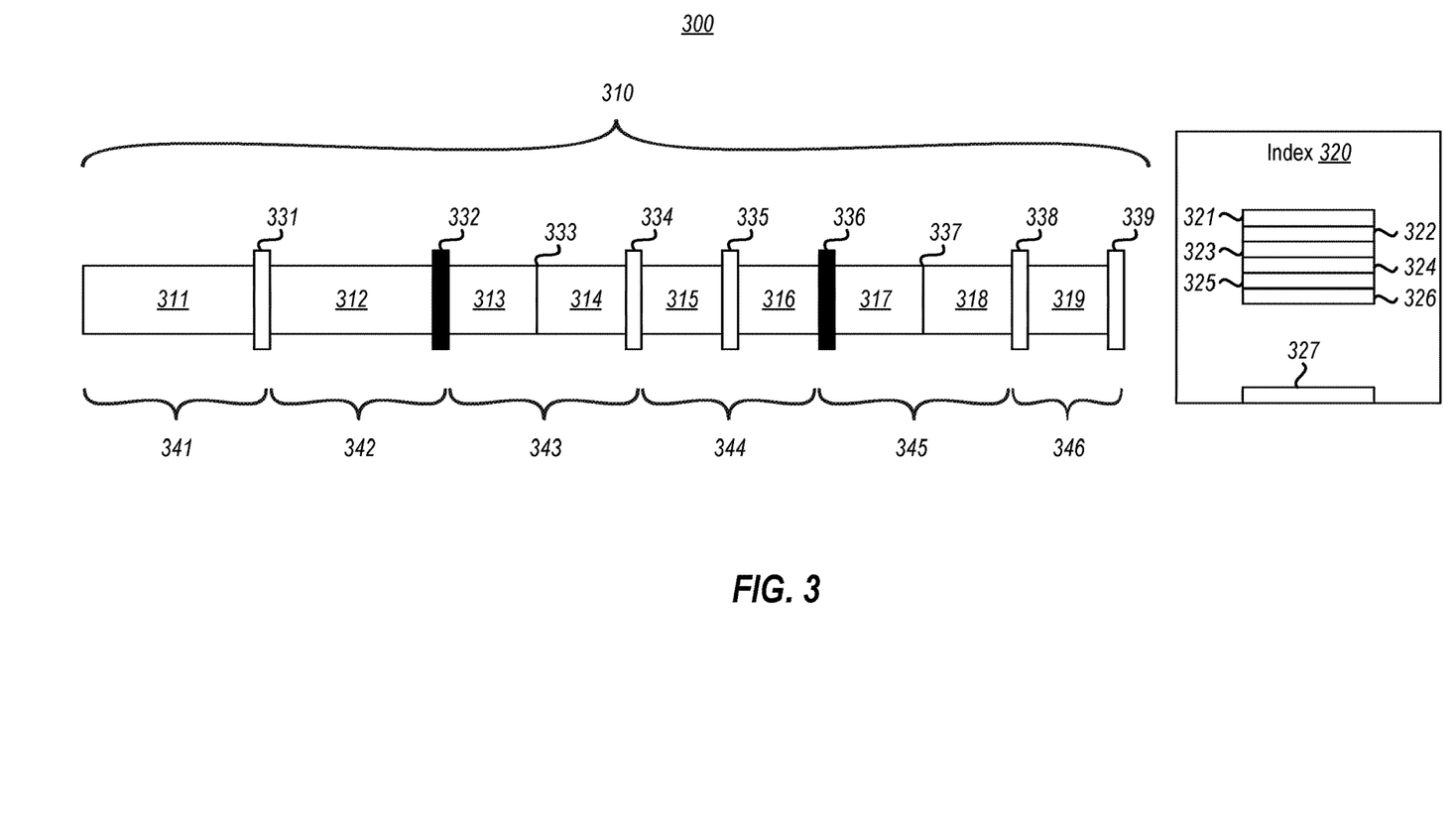
FIG. 3 illustrates an example data structure that includes a segmental portion and an index, the segmental portion including border data structures in accordance with the principles described herein.

FIG. 3 illustrates a data structure 300 that includes a segmental portion 310 as well as an index 320. The segmental portion 310 includes multiple segments 311 through 319 laid out in sequence. Each segment is represented by multiple neighboring elemental data types. For example, a segment could be a string represented by a combination of neighboring characters. A segment could also be a combination of other segments and elemental data types. For example, a segment could be a combination of a string (for a property) and a null value, in which case the segment could be a property-value pair. The segment could also be a combination of other segments. For instance, the segment could be an array of multiple elements, or an object. In one embodiment, the data structure represents human-readable text used to represent objects. As a specific example of this, the data structure 300 could be a binary representation of a JavaScript Object Notation (JSON) file. In this case, the binary representation could further include a word dictionary which replaces commonly appearing words with shorter identifiers, thereby reducing the overall size of the binary representation.

Thus, segments may be hierarchically structured. Accordingly, the segments 311 through 319 do not represent all of the segments in the data structure 300 and could themselves contain constituent segments. Furthermore, though the segmental portion 310 illustrates only nine sequential segments, an actual data structure could contain thousands, millions, or even more sequential segments. However, the simple data structure 300 is used by way of illustration, and the number of sequential segments is kept small in this illustration for purposes of clarity in explaining the broader principles described herein.

In the segmental portion 310, borders 331 through 339 separate each neighboring segment. For instance, border 331 separates neighboring segments 311 and 312, border 332 separates neighboring segments 312 and 313, border 333 separates neighboring segments 313 and 314, and so on until border 338 separates neighboring segments 318 and 319, and finally border 339 terminates the final segment 319. Some of the borders 331 through 339 are actual data structures that exist between neighboring segments. For example, borders 331, 332, 334, 335, 336, 338 and 339 are actual data structures, and are visually emphasized in FIG. 3 by their being taller and wider. On the other hand, borders 333 and 337 simply show where neighboring segments abut. For example, segment 313 is contiguous with segment 314 at border 333, and segment 317 is contiguous with segment 318 at border 337.

In the illustrated embodiment, some of the border data structures are pre-indications of segment length data structures that explicitly represent the size of the following segment. Such pre-indicator border data structures are represented by the corresponding data structure being filled in, and may also be called herein "pre-indicator border data structure" or a "pre-indicator border". For instance, border data structures 332 and 336 are pre-indicator border data structures. The other border data structures 331, 334, 335, 338 and 339 (called herein "marker border data structures" or "marker borders") do not include any size data at all as represented by those data structures being unfilled.

FIG. 3 illustrates that the border data structures include both pre-indicator borders as well as marker borders. However, the principles described herein do not require the use of pre-indicator borders. In accordance with the principles described herein, the data structure includes marker borders that have a predetermined pattern that does not conform with any of the elemental data types that make up the data structure. As an example, suppose that the segmental portion 310 (excluding the border data structures) is composed of characters (in UTF-8 format), numbers (in little-endian format adjusted to have a leading zero), nulls, and Booleans. The marker border data structure would take the form of a byte that is not valid (e.g., is greater than 0xFC hexadecimal) for any of those elemental data types. That said, the principles described herein more generally use any illegal byte value of any elemental data type as being a border data structure. These marker borders can be easily found by performing simple byte-level pattern matching.

The data structure 300 also includes an index 320 that represents a position of each of multiple regions within the data structure 300. Each region includes one or more segments. As an example, the index 320 represents the position of each of the regions 341 through 346. In the illustrated example, the region 341 includes one segment 311, the region 342 includes a single segment 312, the region 343 includes two segments 313 and 314, the region 344 includes two segments 315 and 316, the region 345 includes two segments 317 and 318, and the region 346 includes a single segment 319. This is just by way of example, as a region could include as few as a single segment, and with no upper bound, so long as the index 320 remains useful. In one embodiment, the segmental portion 310 and index 320 are written as separate files. However, in another embodiment, the index 320 is written to the same file as the segmental portion 310. For example, the index 320 is written at the end of the file after the segmental portion 310.

The index 320 includes entries 321 through 326 for each of the respective regions 341 through 346. The index 320 represents the position of each region. In addition, to assist with selection from the data structure, each entry could include any names data items included within the region. If the region includes an array, the entry could also include an array count. As an example to find "runs[0].results[14456].message", the system would find a root element named "runs" in the index, and determine if it then has something named "0" in it, then if that has something called "results", and then the closest indexed name to "14456", and so forth. The entry could also includes a count for arrays to help provide a virtual view of a large array within fully loading the array. For instance, the system could display the first hundred array elements and state "Showing 1-100 of 14,486 elements" since the system knows ahead of time that the array includes 14,486 elements.

The general structure of a data structure that includes marker borders and an index has now been described with respect to FIG. 3 in particular, and also with the aid of FIG. 2. Methods and mechanisms for writing such a data structure, and reading and searching such a data structure, will be described with respect to FIGS. 4 through 7.

Figure 4:
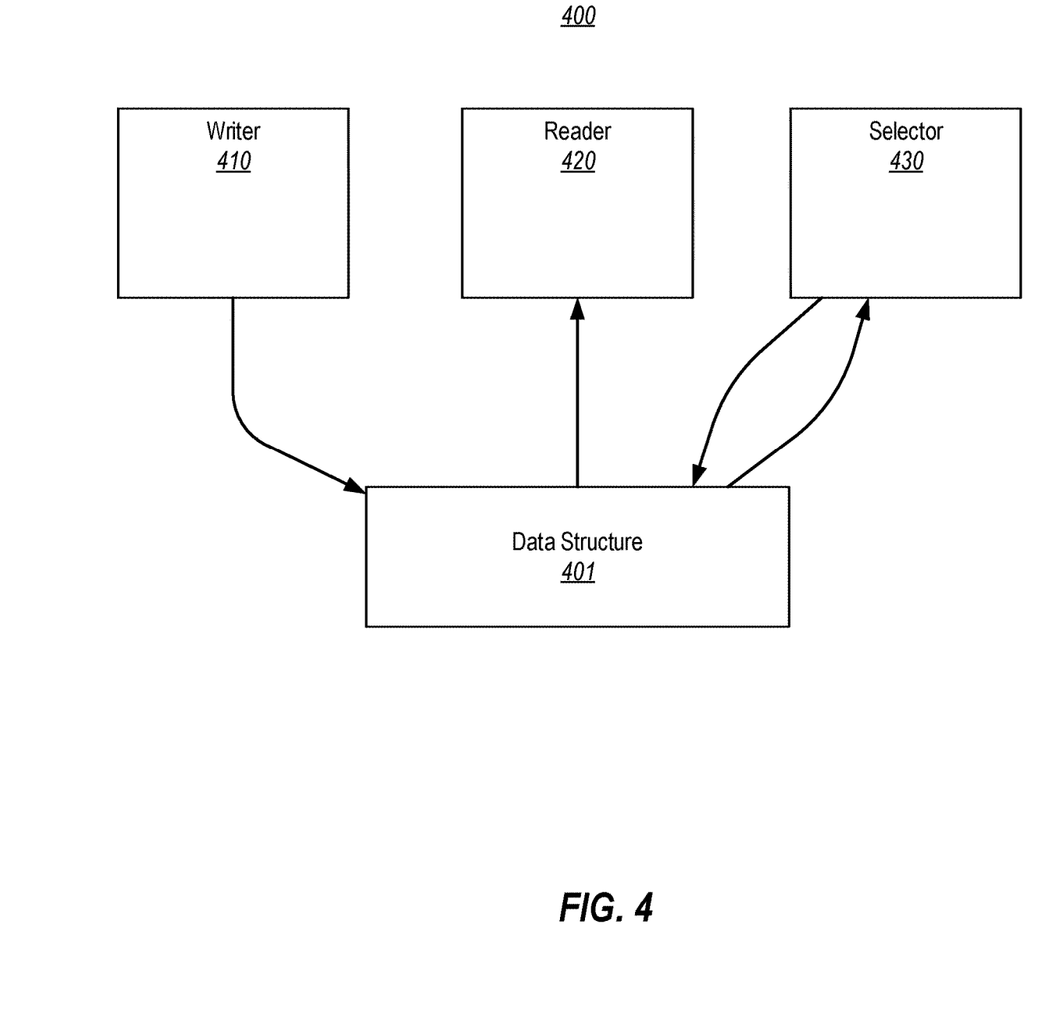
FIG. 4 illustrates an environment in which a writer component writes to a data structure, a reader component reads from the data structure, and a selector component searches the data structure, an example of the data structure being the data structure of FIG. 3.
Figure 5:
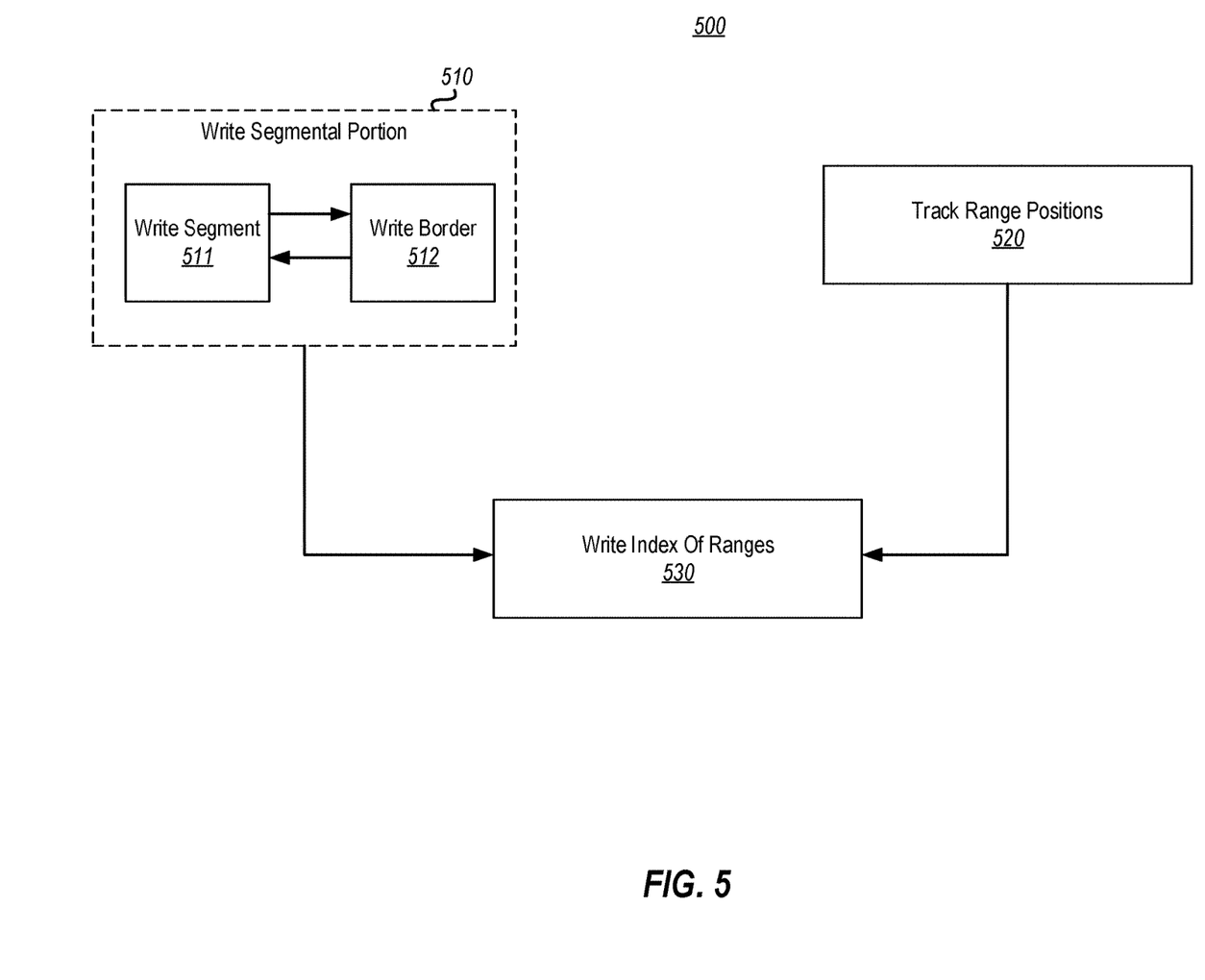
FIG. 5 illustrates a flowchart of a method for writing the data structure, which may be performed by the writer component of FIG. 4.
Figure 6:
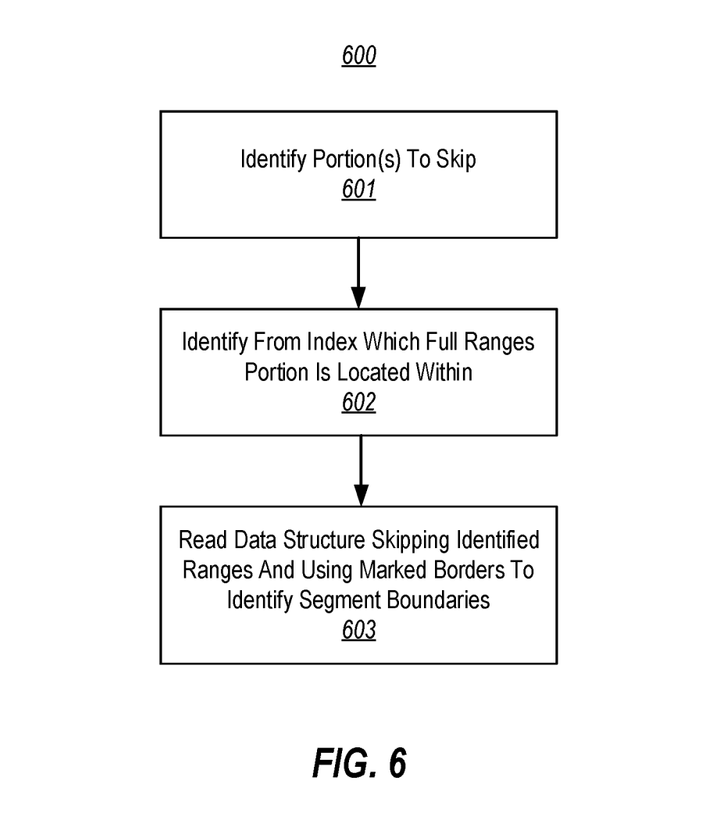
FIG. 6 illustrates a flowchart of a method for reading the data structure, which may be performed by the reader component of FIG. 4.
Figure 7:
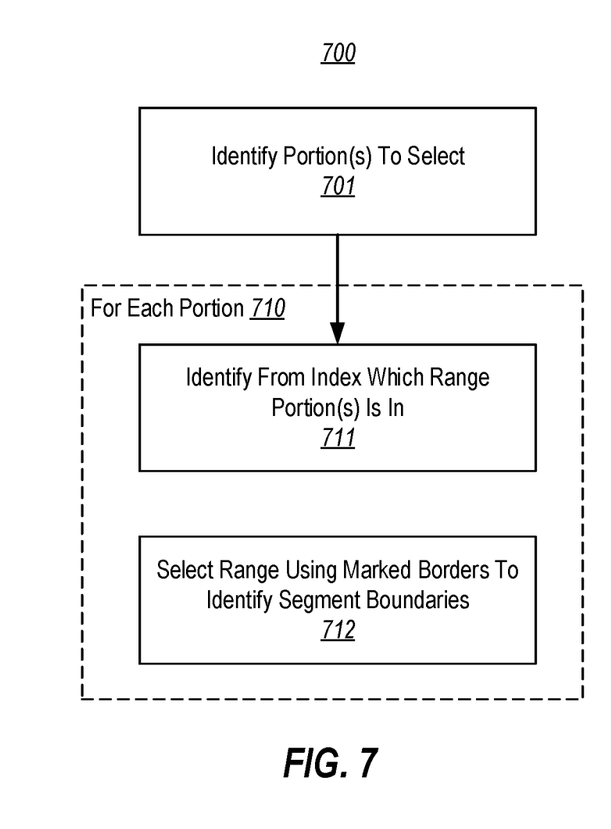
FIG. 7 illustrates a flowchart of a method for selecting from the data structure, which may be performed by the selector component of FIG. 4.

FIG. 4 illustrates an environment 400 in which a writer component 410 writes to a data structure 401, a reader component 420 reads from the data structure 401, and a selector component 430 that selects data items from the data structure 401. The data structure 401 includes marker borders that separate segments and an index, an example of which is the data structure 300 of FIG. 3. FIG. 5 illustrates a flowchart of a method 500 for writing the data structures, which may be performed by the writer component 410 of FIG. 4. FIG. 6 illustrates a flowchart of a method 600 for reading the data structure, which may be performed by the reader component 420 of FIG. 4. FIG. 7 illustrates a flowchart of a method 700 for selecting from the data structure, which may be performed by the selector component 430 of FIG. 4. Each of the write component 410, the reader component 420 and the selector component 430 may be structured as described above for the executable component 106 of FIG. 1.

First, a write operation of the data structure will be described. FIG. 5 illustrates a flowchart of a method 500 for writing the data structure, which may be performed by the writer component 410 of FIG. 4. The method 500 of writing will be described using the data structure 300, since the method 500 may be used to write the data structure 300. As will be described, the writing may be done in a single pass without the writer having to know ahead of time how long each segment that it is about to write is.

The method 500 includes writing the segmental portion (act 510) as well as at the same time tracking the positions of ranges being written (act 520). Referring to FIG. 3 as an example, the writer 410 writes the segmental portion 310 while keeping track of the position of the ranges 341 to 346.

Writing the segmental portion (act 510) roughly alternates between writing a segment (act 511) and writing a border data structure (act 512), sufficient that a reader (e.g., reader 420 or searcher 430 of FIG. 4) can discern the border between segments. In some cases, a border data structure is not needed between neighboring segments in order for the reader to be able to distinguish the boundaries of the neighboring segments. For instance, the writer does not write a border data structure between segments 313 and 314, nor between segments 317 and 318. In the example of FIG. 3, the writer writes both pre-indicator borders (that represent a size of the following segment), as well as marker borders (that mark the border between segments without indicating size). However, in other embodiments, the writer writes only marker borders between each neighboring segment.

To write the data structure 300, the writer would first write the segmental data structure 310 (act 510) by first writing the segment 311 (act 511). The writer did not write a pre-indicator marker for the segment 311, perhaps because the writer did not know the size of the segment 311 prior to initiating the write of the segment 311. Upon completing writing the segment 311, the writer writes a marker border 331 (act 512) which does not represent the size of the following segment 312. This is perhaps because the writer does not know the length of the following segment 312. Note that any reader can find the border between the segments 311 and 312 due to the existence of the explicit marker border 331. Furthermore, the reader can tell that the marker border 331 is a border, and not part of a segment, because the marker border 331 falls outside of a valid value for any of the elemental data types of the elemental data items that make up any of the segments 311 through 319. As an example, the marker border 331 is perhaps a byte value that is not valid for any bytes that belong to any of the elemental data types (e.g., is greater than 0xFC hexadecimal).

The writer continues writing the segmental portion 310 (act 510) by writing the second segment 312 (act 511). Upon completing writing the segment 312, the writer writes a pre-indicator border 332 (act 512) which does represent the size of the following segment 313, and thus the writer knows the size of the next segment 313 prior to initiating the write of the next segment 313. Again, a reader can distinguish the border between the segments 312 and 313 using the explicit border 332.

The writer continues writing the segmental portion 310 (act 510) by writing the third segment 313 (act 511). Upon completing writing the segment 313, the writer does not write an explicit border, because it is not needed. A reader can determine that the border 333 is the size of the segment 312 (as represented in the pre-indicator border 332) from the beginning of the segment 312. However, for redundancy, or for flexibility should there be readers that cannot interpret the size expressed in the pre-indicator border 332, the writer could place a marker border at the border 333.

The writer continues writing the segmental portion 310 (act 510) by writing the fourth segment 314 (act 511). Upon completing writing the segment 314, the writer writes a marker border 334 (act 512) which does not represent the size of the following segment 315, perhaps because the writer does not know the size of the segment 315 prior to initiating writing of the following segment 315. Again, a reader can distinguish the border between the segments 314 and 315 using the explicit border 334.

The writer continues writing the segmental portion 310 (act 510) by writing the fifth segment 315 (act 511). Upon completing writing the segment 315, the writer writes a marker border 335 (act 512) which does not represent the size of the following segment 316, perhaps because the writer does not know the size of the segment 316 prior to initiating writing of the following segment 316. But, a reader can distinguish the border between the segments 315 and 316 using the explicit border 335.

The writer continues writing the segmental portion 310 (act 510) by writing the sixth segment 316 (act 511). Upon completing writing the segment 316, the writer writes a pre-indicator border 336 (act 512) which does represent the size of the following segment 317, and thus the writer knows the size of the next segment 317 prior to initiating the write of the next segment 317. A reader can distinguish the border between the segments 316 and 317 using the explicit border 336.

The writer continues writing the segmental portion 310 (act 510) by writing the seventh segment 317 (act 511). Upon completing writing the segment 317, the writer does not write an explicit border, because it is not needed. A reader can determine that the border 337 is the size of the segment 317 (as represented in the pre-indicator border 336) from the beginning of the segment 317. However, for redundancy, or for flexibility should there be readers that cannot interpret the size expressed in the pre-indicator border 336, the writer could place a marker border at the border 337.

The writer continues writing the segmental portion 310 (act 510) by writing the eighth segment 318 (act 511). Upon completing writing the segment 318, the writer writes a marker border 338 (act 512) which does not represent the size of the following segment 319, perhaps because the writer does not know the size of the segment 319 prior to initiating writing of the following segment 319. Again, a reader can distinguish the border between the segments 318 and 319 using the explicit border 338.

The writer then completes writing of the segmental portion 310 (act 510) by writing the final segment 319 (act 511). Upon completing writing the segment 319, the writer writes a marker border 339 (act 512). Again, a reader can distinguish that the marker border 339 marks the end of segment 319.

Returning to FIG. 5, while the writer is writing the segmental portion (act 510), the writer is also tracking the position of regions (act 520). As an example, while writing the segmental portion 310, the writer is also tracking the position of regions 341 through 346. Example criteria for selecting the extent of regions will be described later. But for now, assume that the index is to include positions of the regions 341 through 346 as shown in FIG. 3.

After writing segment 311 (as part of act 510), the writer determines that the segment 311 is to be included in its own region 341, and notes (e.g., in memory) the position of region 341 (as part of act 520). After writing segment 312, the writer again determines that the segment 312 is to be included in its own region 342, and notes the position of the region 342. After writing segment 314, the writer determines that segments 313 and 314 are both to be included in a single region 343, and notes the position of region 343. After writing segment 316, the writer determines that segments 315 and 316 are both to be included in a single region 344, and notes the position of region 344. After writing segment 318, the writer determines that segments 317 and 318 are both to be included in a single region 345, and notes the position of region 345. After writing the final segment 319, the writer determines that segment 339 is to have its own region 346, and notes the position of region 346.

Thus, because the writer had been tracking the position of the regions of segments while writing the segmental portion, the writer is prepared to write the index 320 once completed writing the segmental portion 310. The writer thus writes an index representing the regions and their positions within the data structure (act 530). For instance, entries 321 through 326 within the index 320 represent the identity and positions of corresponding regions 341 through 346 of the segmental portion 310. As previously mentioned, this index may be written in a separate file from, or in the same file as, the segmental portion. If writing to a separate file, the index may be written while the segmental portion is also being written. In one embodiment, the index 320 is written at the end of the same file as the segmental portions.

Note that the writer can write the data structure in a single pass while being able to mark locations between segments, even though the writer may not know ahead of time how large a segment is. Furthermore, the writer never has to go back and fill in pre-indicators of length because the writer writes the data structure in a way that a reader can determine boundaries between segments even without such pre-indicators. Furthermore, because marker borders are written using values that are illegal in any of the elemental data types that make up the segments, readers can with certainty identify the border and not confuse the same with a content of a segment. Additionally, writing may be performed without using escaping because it is not necessary to disambiguate a border from segmental content. As an example, a quotation mark can be included within a string without escaping that quotation mark. This simplifies the logic associated with writing, as well as reading, since no logic is required to write or interpret escaping.

In the example in which the index 320 is located in a separate file as the segmental portion 310, the names of the respective files may be used by a reader to correlate the file containing the index 320 with the file containing the segmental portion 310. In the example in which the index 320 is located at the end of the segmental portion 310 in the same file, a different mechanism can be used to show a reader where the index 320 is within the file. For instance, data structure 327 at the very end of the data structure 300 (shown within index 320) represents the size of the index 320 and can be included as a final portion (itself of predetermined size and format) within the index 520. In order to begin reading the data structure 300, a reader can be programmed to read the final portion 327 of the data structure so that the reader can identify where the beginning of the index 320 is. Then, the reader can read the index to identify where regions 341 through 346 are within the data structure 300. In one embodiment, the entries 321 through 326 further include an identification of the segment(s) 311 through 319 contained within each region. However, this would make the index 320 rather large. In one embodiment, the entries are each 32 bytes in size.

The writer may be configured to select the regions so as to make the index 320 small relative to the size of the total data structure 300. This is so that the reader can quickly read the entirety of the index 320 so as to quickly understand the position of each region. An example criteria for selection, the writer can make regions so that they have roughly some minimum size (e.g., 32 kilobytes), and single segments that are larger than that size get their own region so that this criteria is satisfied. If that is the case, then the index 320 can be designed to be roughly less than 0.1 percent of the total size of the data structure 300. However, the writer can be configured to change this proportion by changing the size of segments that receive their own region, and changing the size of the designed minimum size of a region. As an example, suppose that a large array called "big" is stored in the data structure. There could be an entry every 32 kilobytes, thus an entry for big[1], an entry for big[255] located 32 kilobytes later, and so forth.

FIG. 6 illustrates a method 600 for reading a data structure while allowing for skipping over portions that are not of interest, in accordance with the principles described herein. The method 600 may be performed by the reader 420 of FIG. 4 in order to read the data structure 401 of FIG. 4. As an example, the method 600 may be performed in order to read the data structure 300 of FIG. 3, skipping over portion(s) of the data structure 300 of FIG. 3.

Referring to FIG. 6 the method 600 includes identifying portion(s) of the data structure to skip over (act 601). Then, reader readers from the index to identify, for each of the identified portion(s), which full ranges the portion is located within (act 602). The reader then reads the data structure skipping over those identified full regions that contain the portion not of interest (act 603). All the while, while reading, the reader is able to identify boundaries between segments using the marker borders, and potentially any pre-indicator borders.

FIG. 7 illustrates a flowchart of a method 700 for selecting portion(s) of a data structure, in accordance with the principles described herein. The method 700 may be performed by the selector 430 of FIG. 4 in order to select from the data structure 401 of FIG. 4. As an example, the method 700 may be performed in order to select portion(s) of the data structure 300 of FIG. 3.

The selector identifiers which portion(s) of the data structure to select (act 701). Then, for each portion, the content of dashed-lined box 710 is performed. Specifically, the selector identifies from the index which range the portion is located in (act 711). Then, the selector obtains the location of that range from the index, and reads the range (act 712), using marker borders and/or pre-indicator borders to determine one segment from the next.

Because this selection from random places in the data structure is possible using the principles described herein, multi-threaded loading of the data structure is also possible. With the index, the data structure could include a massive array and the index can be used to discern where specific parts of the array are. Each thread can tell which elements in the array it is filling out, so the threads can each work without any post-merging or any need to lock anything since they arrange to take non-overlapping portions of the array.

Also, the memory allocation can be done ahead of time because the selector tell how big to allocate the array is that it will be filling.

Accordingly, the principles described herein describe a unique data structure that includes marker borders in a segmental portion, and an index. The data structure is written in a single pass, and readers can quickly read the data structure or portions thereof, skipping over portions not of interest.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system configured to efficiently write a data structure, the computing system comprising:
   one or more processors; and
   one or more computer-readable media having thereon computer-executable instructions that are structured such that, when executed by the one or more processors, cause the computing system to perform single pass writing of a data structure having a plurality of elemental data items of a plurality of elemental data types, the plurality of elemental data items being combined with neighboring elemental data items to form a plurality of segments within the data structure, the writing including:
      at respective interfaces between each of at least some of the plurality of segments, writing a predetermined border data structure that does not conform to a data format for any of the plurality of elemental data types, the predetermined border data structure representing a border between neighboring segments, the predetermined border data structure not including size data for any of the neighboring segments;
      while writing the plurality of elemental data items, tracking positions of a plurality of regions containing one or more neighboring segments, wherein tracking the positions of the plurality of regions includes selecting regions that are to be tracked to include regions that represent single segments that are larger than a predetermined size; and
      after writing the plurality of elemental data items, writing an index that represents a position of the plurality of regions, wherein a size of the index is limited to a determined proportion relative to a total size of the data structure.

2. The computing system in accordance with claim 1, the predetermined border data structure being a unique byte that is not permitted for each of the plurality of elemental data types.

3. The computing system in accordance with claim 1, each of the plurality of elemental data types being formatted such that a range of highest byte values are illegal for all elemental data types, the predetermined border data structure being any or one or more byte values within the range of highest byte values.

4. The computing system in accordance with claim 1, wherein selecting the regions further includes:
   selecting regions that are located more than a minimum distance away from prior segments.

5. The computing system in accordance with claim 1, one of the plurality of elemental data items being a character, and another of the elemental data items being a number.

6. The computing system in accordance with claim 1, wherein a quotation mark is included in the plurality of elemental data items, and wherein the quotation mark, when read, is not considered to be an escape character.

7. The computing system in accordance with claim 1, for each of the respective interfaces at which the border data structure is written, a length of a following segment of the plurality of segments is not known prior to beginning write of that following segment.

8. The computing system in accordance with claim 7, wherein said writing further comprises:
   at respective interfaces between each of at least some of the plurality of segments in which a size of the following segment is known, writing a size of the following segment as opposed to writing a border data structure.

9. The computing system of claim 1, wherein the plurality of elemental data items is written to a single file, and wherein the index is also written into that single file at an end of the single file.

10. The computing system of claim 1, wherein the plurality of elemental data items is written to a single file, and wherein the index is written into a separate file.

11. The computing system of claim 1, wherein the data structure includes a binary representation of a human-readable text file used to transmit and store data objects.

12. The computing system of claim 11, wherein:
    the data structure includes all information from the human-readable text file,
    the data structure is convertible into the human-readable text file, and
    the human-readable text file is convertible into the data structure.

13. A computing system configured to read a data structure, the computing system comprising:
    one or more processors; and
    one or more computer-readable hardware storage devices that store instructions that are executable by the one or more processors to cause the computing system to read a portion of a data structure, the data structure comprising:
      a plurality of elemental data items of a plurality of elemental data types, the plurality of elemental data items being combined with neighboring elemental data items to form a plurality of segments within the data structure,
      predetermined border data structures between respective interfaces between each of at least some of the plurality of segments, the predetermined border data structures not conforming to a data format for any of the plurality of elemental data types, the predetermined data structures representing borders between neighboring segments, the predetermined data structures not representing a size of any of the neighboring segments, and
      an index that represents a position of a plurality of regions that each include one or more segments of the plurality of segments, wherein a size of the index is limited to a determined proportion relative to a total size of the data structure, and wherein positions of the plurality of regions are tracked, said tracking includes selecting regions that are to be tracked to include regions that represent single segments that are larger than a predetermined size;

the reading comprising:
- identifying a portion of the data structure that is to be read;
- reading the index;
- identifying, from the index, which region the identified portion is located within;
- scanning the data structure from a position identified in the index as corresponding to the identified region, wherein said scanning includes searching for predetermined border data structures and identifying the portion to be read using at least one predetermined border data structure founding during the scanning; and
- after said scanning, reading the portion from within the data structure.

14. The computing system of claim 13, wherein the predetermined border data structures are unique bytes that are not permitted for each of the plurality of elemental data types.

15. The computing system of claim 13, wherein each of the plurality of elemental data types is formatted such that a range of highest byte values are illegal for all elemental data types, and wherein the predetermined border data structures include byte values within the range of highest byte values.

16. A method for reading a data structure and skipping over at least a portion of the data structure, the data structure comprising:
- a plurality of elemental data items of a plurality of elemental data types, the plurality of elemental data items being combined with neighboring elemental data items to form a plurality of segments within the data structure,
- predetermined border data structures between respective interfaces between each of at least some of the plurality of segments, the predetermined border data structures not conforming to a data format for any of the plurality of elemental data types, the predetermined border data structures representing borders between neighboring segments, and the predetermined border data structures not representing a size of any of the neighboring segments, and
- an index that represents a position of a plurality of regions that each include one or more segments of the plurality of segments, wherein a size of the index is limited to a determined proportion relative to a total size of the data structure, and wherein positions of the plurality of regions are tracked, said tracking includes selecting regions that are to be tracked to include regions that represent single segments that are larger than a predetermined size;

the method comprising:
- identifying a portion of the data structure that is to be skipped;
- reading the index;
- identifying, from the index, which region the identified portion is located within;
- scanning the data structure while searching for predetermined border data structures;
- identifying a position of the portion to be skipped using at least one predetermined border data structure founding during the scanning; and
- refraining from reading the portion from within the data structure.

17. The method of claim 16, wherein the predetermined border data structures respectively include a corresponding unique byte that is not permitted for each of the plurality of elemental data types.

18. The method of claim 16, wherein each of the plurality of elemental data types is formatted such that a range of highest byte values are illegal for all elemental data types, and wherein the predetermined border data structures include byte values within the range of highest byte values.

* * * * *